March 5, 1963  K. DAWKINS  3,079,887
MINIATURIZED HYDROMETER
Filed Aug. 22, 1960
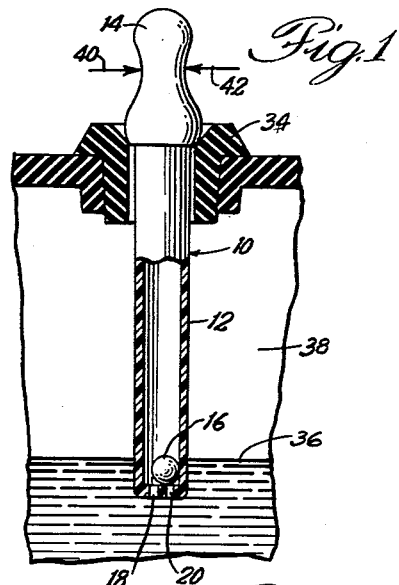
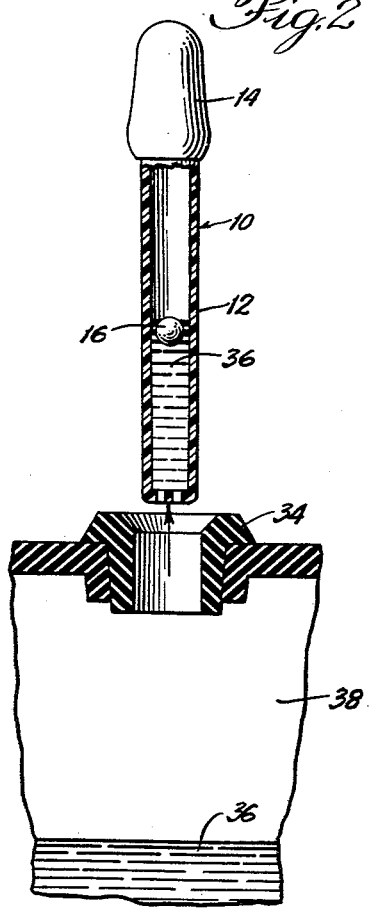
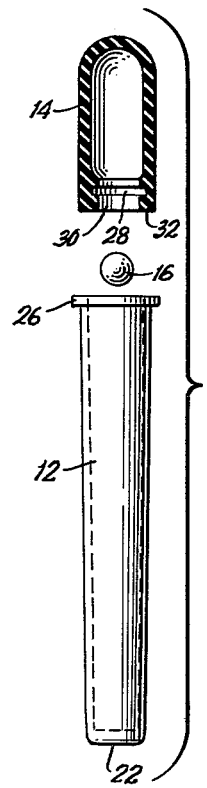
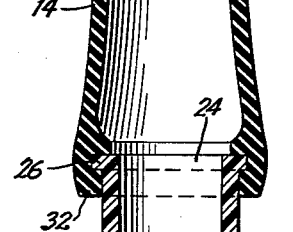
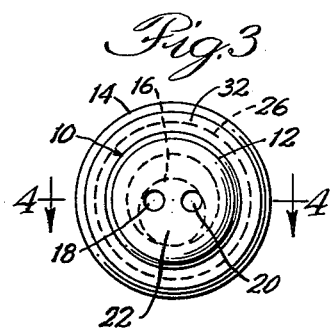
INVENTOR:
Kenneth Dawkins,
BY Bair, Freeman & Molinare
ATTORNEYS.

3,079,887
MINIATURIZED HYDROMETER
Kenneth Dawkins, Minneapolis, Minn., assignor to Franklin Manufacturing Company, a corporation of Delaware
Filed Aug. 22, 1960, Ser. No. 51,165
1 Claim. (Cl. 116—114)

This invention relates generally to hydrometer devices, and more particularly to new and improved hydrometer devices for determining the density of a solution.

Those skilled in the art will readily appreciate that hydrometer float apparatus, in various scale configurations, have been used for many years to test the charge or discharge condition of the electrolyte in automotive storage batteries. In one known type of prior art device, a transparent container is provided with a "built-in" charge indicator in the form of a plurality of unmarked floats which rise or fall, depending on the changing specific gravity of the electrolyte. This prior art structure is exemplified by the patent to Linebarger, No. 1,785,963, issued December 23, 1930.

The hydrometer structures of the prior art have not proved completely satisfactory in all respects. For example, a single inlet opening generally is provided at the end of the device adapted to be placed in the electrolyte, and should an indicator float be too large with respect to the single inlet opening, it may happen that air bubbles become trapped under the indicator float when the electrolyte is drawn into the container. This condition can give rise to inaccurate indications since the air bubbles may cause the indicator floats to rise without regard to the specific gravity condition of the electrolyte.

Further, it is possible that a surface tension condition may be created wherein the indicator floats may be caused to float in fluids of low specific gravity to provide erroneous indications of battery condition.

It is a general object of this invention to provide a new and improved hydrometer device of reliable and inexpensive construction.

It is another object of this invention to provide a new hydrometer device comprising a transparent container having a plurality of electrolyte openings at one end thereof so that an indicator float is completely immersed in the electrolyte and its position is not affected by air bubbles.

It is still another object of this invention to provide an improved hydrometer device comprising a single unmarked indicator float positioned with a small transparent barrel having a plurality of entry holes at one end thereof, and a resilient bulb at the other end thereof to provide the necessary suction for drawing the electrolyte to be tested into the barrel.

It is a further object of this invention to provide an improved miniaturized hydrometer device as above, which comprises a single indicator float adjusted to a float-no float specific gravity which serves to indicate if the electrolyte of a battery is above or below a predetermined point.

It is a still further object of this invention to provide an improved hydrometer device which is small enough to be carried in a pocket of clothing, suitably protected in an acid proof sheath, or to be hung in a sheath which may be attached to a battery post or battery cable so as to conveniently be available for ready testing of the battery electrolyte whenever desired.

It is a still further object of this invention to provide an improved miniaturized hydrometer device which is characterized by its small size and weight, its economy of construction and its reliability of operation.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawings in which:

FIGURE 1 is a side elevational view, with the barrel partly broken away and in cross-section, of the miniaturized hydrometer device in position to receive a test supply of electrolyte from a storage battery;

FIGURE 2 illustrates a side elevational view of the hydrometer device of the invention, with the barrel partly broken away and in cross-section, in indicating condition after the sample of electrolyte has been drawn therewithin;

FIGURE 3 is a enlarged end view of the invention showing the plurality of entry openings at the end of the barrel;

FIGURE 4 is an enlarged detailed side elevation in cross-section taken substantially as shown along line 4—4 of FIGURE 3; and FIGURE 5 is an enlarged exploded view illustrating the component parts of one preferred embodiment of the invention.

Referring now to the drawing, there is shown one preferred illustrative embodiment of miniaturized hydrometer 10 in accordance with the invention. As particularly shown in FIGURES 4 and 5 of the drawing, the miniaturized hydrometer 10 advantageously comprises an elongated cylindrical barrel 12, a resilient bulb 14 and a single indicator float 16.

Preferably, the elongated barrel 12 is formed of a suitable acrylic or other plastic which is not highly affected by gasoline, grease or sulphuric acid. The plastic barrel 12 is transparent so that the indicator float 16 may be viewed through the barrel during the operation of the hydrometer.

In accordance with a unique feature of this invention, a pair of openings 18 and 20 are provided in the bottom wall 22 of the barrel 12. The openings 18 and 20 extend through the bottom wall to permit a test sample of the electrolyte to be drawn into the interior of the barrel 12, and to permit the sample of the electrolyte to be discharged from the barrel 12 after the test is made.

A relatively wide opening 24 is formed at the upper end of the barrel 12 opposite the end wall 22. Advantageously, the upper end of the cylindrical barrel 12 is provided with an outwardly extending flange or lip 26 which is of greater diameter than the maximum diameter of the barrel. A bulb 14, which is formed of a suitably resilient material, is secured to the upper end of the barrel 12 at the flange 26. To this end, the resilient bulb 14 is provided with an interior annular groove 28 of a dimension corresponding to the flange 26 so that the bulb may be inserted over the upper end of the barrel 12 to seat the flange 26 in the groove 28.

It can be seen in FIGURES 4 and 5 that the bulb 14 is generally cup-shaped in appearance with an opening 30 at the lower end thereof for enabling the bulb 14 to be positioned over the upper end of the barrel 12, as described above. A lip portion 32 of the bulb 14 extends below the circular groove 28 so that when the bulb 14 is positioned on the barrel 12, as shown in FIGURE 4, the lower lip 32 of the bulb serves to seal the bulb to the barrel to prevent fluid leakage at their junction.

Before the resilient bulb 14 is assembled in position on the barrel 12, an indicator float 16 is placed within the interior of the barrel. Advantageously, the indicator float is formed of a suitable hydrometric material of predetermined specific gravity or density. In one preferred embodiment of my invention, it has been found advantageous to form the indicator float 16 of brightly colored wax or polystyrene, which is adjusted to the desired float-no float specific gravity by incorporating into the wax or polystyrene the necessary amounts of a heavily insoluble substance, such as barium sulphate.

The operation of the invention is illustrated in FIGURES 1 and 2 of the drawing. The miniaturized hydrometer advantageously is inserted through the battery cap 34 into contact with the electrolyte 36 within the battery cell 38. The resilient bulb 14 is manually compressed as indicated by the arrows 40 and 42, and when the bulb 14 is released, the resultant suction causes the electrolyte 36 to be drawn through the openings 18 and 20 at the bottom wall of barrel 12 into the interior of the barrel.

The miniaturized hydrometer 10 is then removed from the battery cap 34 and the float or no float condition of the indicator float 16 serves to reveal the charged condition of the battery.

Those skilled in the art will immediately recognize the many advantages provided by the present invention which are not present in the prior art hydrometer devices. The miniaturized hydrometer of the invention serves as a screening device which indicates if a battery has an electrolyte that is above or below a chosen point. This point may be selected at any level and the indicator float is made so that it will float if the specific gravity of the electrolyte is at or above this point and will sink if the specific gravity of the electrolyte is below this chosen point. The size of the entire miniaturized hydrometer is such that it may be carried in a pocket, suitably protected in an acid-proof sheath or hung in a sheath which may be attached to a battery post or a battery cable.

As a feature of the invention which results from its relatively small size, it is contemplated that the miniaturized hydrometer could be mounted as a permanent part of the vent cap, thus forming a permanent part of each battery. Alternatively, the invention also could be clipped to a vent cap if suitable provisions were made therefor. Manifestly, one of the unique advantages of the present invention is the provision of a hydrometer device sufficiently small and sufficiently inexpensive so that it could be carried on the person or could be provided adjacent each automotive battery for the convenience of the consumer and the dealer.

Those skilled in the art will further appreciate that the provision of a plurality of openings in the bottom wall of the barrel serves to overcome the adverse possibility of erroneous indications due to air bubbles within the electrolyte. Thus, the presence of air bubbles in the electrolyte within the barrel could cause the indicator float to rise regardless of the condition of the electrolyte and an erroneous indication would be provided. The provision of a plurality of entry holes in the bottom wall of the hydrometer barrel remedies the possibility of air bubbles being trapped under the indicator float since under normal suction at least one of the holes permits the electrolyte to spray over the indicator float 16.

In addition, the construction of the present invention, and the relationship of the dimensions of the indicator float 16 relative to the inner diameter of the barrel 12 is such that relief is provided against the creation of a surface tension condition within the barrel by which the indicator float 16 may be caused to float erroneously to provide an improper indication.

While there has been shown and described a specific embodiment of the present invention it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

The improvement of a miniaturized hydrometer device for testing the specific gravity of an electrolyte comprising an elongated tubular member of transparent plastic material adapted to be placed into an electrolyte to be tested, said tubular member being defined by an elongated tubular side wall portion and a bottom wall portion, said tubular side wall portion having a relatively wide opening formed at the top thereof and said bottom wall portion having a plurality of relatively small openings extending therethrough, said relatively small openings being formed in parallel, spaced-apart relation in said bottom wall portion with the longitudinal axis of each opening being substantially parallel to the longitudinal axis of said tubular member and spaced outwardly of the central portion thereof, a manually actuatable bulb member of resilient material positioned on said tubular member in sealed, enclosing relation to said relatively wide opening such that the release of said bulb from a manually compressed condition causes the electrolyte to be drawn through said plurality of relatively small openings into the interior of said tubular member, and a single indicator float of predetermined specific gravity positioned within said tubular member and serving by its float or no-float position in the electrolyte to indicate the specific gravity condition of said electrolyte.

References Cited in the file of this patent

UNITED STATES PATENTS

| | | |
|---|---|---|
| D. 150,328 | Appel | July 27, 1948 |
| 192,100 | Walker et al. | June 19, 1877 |
| 1,694,138 | Neuwirth | Dec. 4, 1928 |
| 1,697,353 | Garrison | Jan. 1, 1929 |
| 2,234,884 | Teel | Mar. 11, 1941 |
| 2,548,558 | Raney | Apr. 10, 1951 |

FOREIGN PATENTS

| | | |
|---|---|---|
| 929 | Great Britain | of 1897 |